United States Patent [19]

Stevenson et al.

[11] 4,440,116

[45] Apr. 3, 1984

[54] COOLANT INJECTOR

[75] Inventors: David L. Stevenson, Corunna; Frank M. Seleno, Haslett, both of Mich.

[73] Assignee: Schmelzer Corporation, Flint, Mich.

[21] Appl. No.: 397,558

[22] Filed: Jul. 12, 1982

[51] Int. Cl.³ .......................................... F02M 25/02
[52] U.S. Cl. ................................. 123/25 J; 123/25 A; 123/540; 123/563
[58] Field of Search ................. 123/25 R, 25 A, 25 J, 123/25 K, 25 L, 25 M, 25 N, 540, 563

[56] References Cited

U.S. PATENT DOCUMENTS

| | | | |
|---|---|---|---|
| 2,725,858 | 12/1955 | Tivoli | 123/25 J |
| 2,922,408 | 1/1960 | Humphries et al. | 123/25 N |
| 3,196,606 | 7/1965 | Cholvin et al. | 123/25 J |
| 4,208,989 | 6/1980 | Hart | 123/25 M |

*Primary Examiner*—Ira S. Lazarus
*Attorney, Agent, or Firm*—Fisher, Gerhardt, Crampton & Groh

[57] ABSTRACT

Apparatus for injecting coolant into the fuel-air mixture supplied to a turbocharged internal combustion engine in which coolant is stored in a reservoir that is connected to the outlet side of a turbocharger compressor and is pressurized during times that the turbocharger is generating positive pressures above a predetermined level. The pressure in the reservoir forces coolant to the inlet side of the turbocharger to cool fuel and injection is interrupted when the pressures are below that level and cooling of the fuel-air mixture is not required.

8 Claims, 2 Drawing Figures

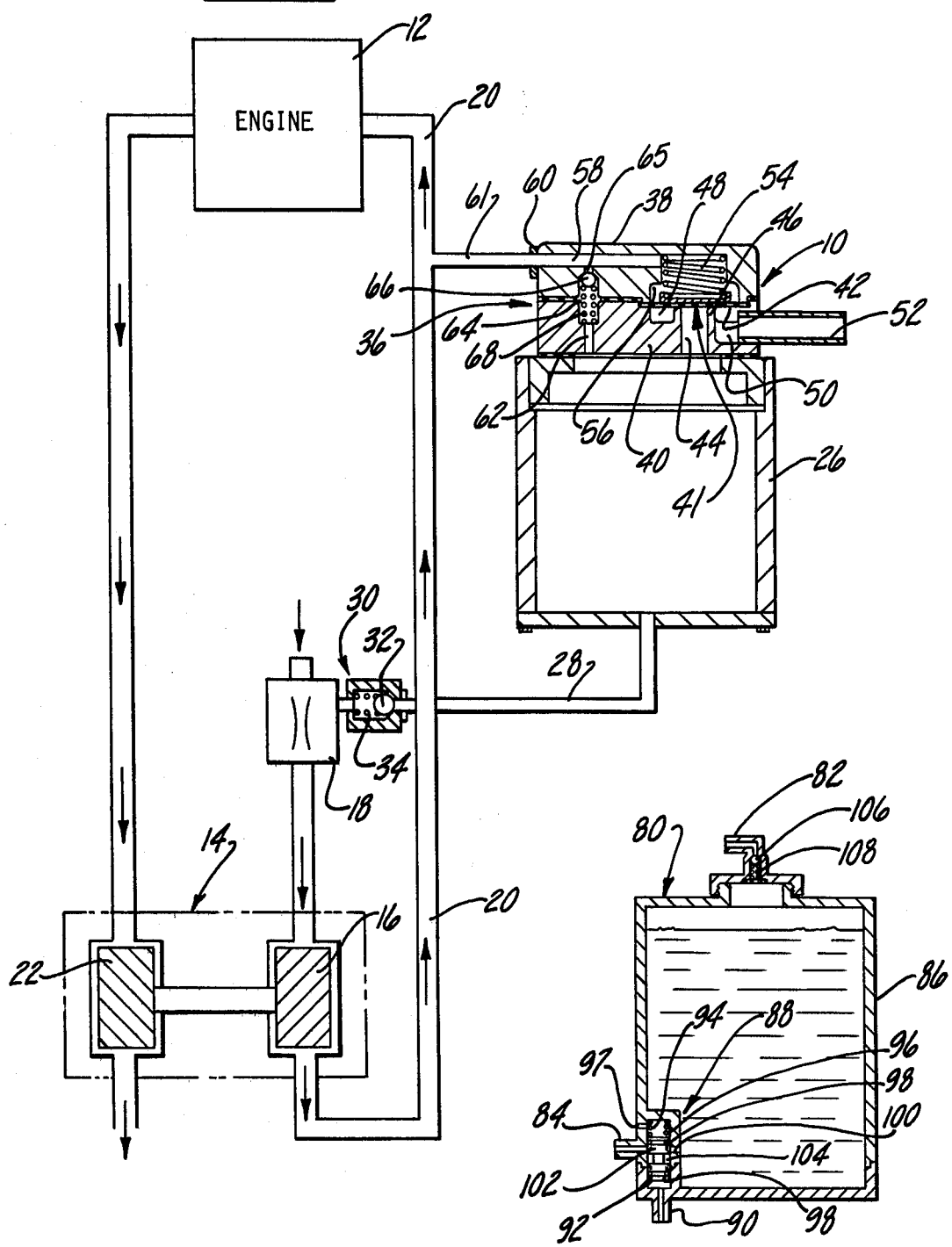

COOLANT INJECTOR

This invention relates to apparatus for cooling the combustion air for internal combustion engines and more particularly to a water injection system for turbocharged engines.

When internal combustion engines are operated with a turbocharger, the combustion air is heated by the work expended upon it as it is compressed. Various arrangements have been provided for cooling this air because it has been recognized that cooler combustion air reduces detonation. The water cooled air enables more power to be developed because the cool air has a greater density and a greater oxygen content available for combustion of a fuel charge.

The cooling is presently obtained by a variety of devices including injectors which are operated continuously during acceleration of an engine or pressure systems which are responsive to intake manifold pressure. Unfortunately, both such systems have undesirable characteristics in that it is possible to inject water or other coolant at a time when it is not needed thereby impairing performance of the engine. One example of this is after acceleration has been initiated and then momentarily interrupted. During the interruption, water sometimes continues to be injected even though the fuel supply has been shut off.

Another fault of current water injection systems for turbocharged engines is that they are unduly complex, are difficult to install and require a multiplicity of parts as well as constant monitoring to insure that they are operating properly.

It is an object of the invention to provide coolant injecting apparatus for turbocharged internal combustion engines in which coolant is injected to cool the fuel-air mixture only at such times as it is required that is, when the engine is being accelerated.

It is another object of the invention to provide apparatus for injecting coolant into the fuel-air mixture supplied to a turbocharger for an internal combustion engine which employs the pressure generated by the turbocharger during acceleration of the engine.

The objects of the invention are achieved by coolant injecting apparatus including a reservoir for storing liquid coolant which is connected to the outlet side of a turbocharger compressor, that is, the intake manifold of the engine through a check valve which allows the reservoir to become pressurized when the pressure in the manifold attains some predetermined level. This causes liquid coolant to be ejected from the reservoir through a delivery passage to the inlet side of the compressor of the turbocharger, for example, at the carburetor to cool fuel before it is subjected to compression. The coolant injecting apparatus is provided with control means responsive to pressure in the intake manifold at the outlet side of the turbocharger so that when the manifold pressure drops below some predetermined level and cooling of the fuel is no longer needed, additional ejection of coolant is prevented. In one embodiment of the invention, the control means is a pressure responsive diaphragm which moves into and out of engagement with an opening communicating between the reservoir and the atmosphere to relieve the pressure in the reservoir to prevent further coolant ejection. In still another embodiment of the invention the reservoir is pressurized during periods of time when the turbocharger is supplying positive pressure and ejection occurs by the action of pressures above and below a predetermined level to respectively, open and close a valve controlling the ejection of liquid coolant from the reservoir which remains positively charged but inoperative to discharge coolant except when pressures are above the predetermined level.

The preferred embodiments of the invention are illustrated in the drawings in which:

FIG. 1 is a diagrammatic view of apparatus for injecting coolant in a fuel system of a turbocharged engine; and FIG. 2 is a diagrammatic view of another embodiment of the invention.

Referring to the drawings an apparatus for injecting coolant is designated generally at 10 and is shown in use with an internal combustion engine 12 equipped with a turbocharger 14.

The turbocharger 14 includes a compressor 16 receiving an air and fuel charge from a carburetor 18 and delivers it at an increased pressure to the intake manifold 20 communicating with the intake side of the engine 12. The turbocharger compressor 16 is driven by a turbine 22 rotatably driven in response to the flow of exhaust gasses from the engine 12. The coolant injector 10 includes a reservoir 26 which is placed in communication with the carburetor 18 through means of a delivery conduit 28 and injector 30. Coolant is forced from the reservoir 26 by pressure in a manner to be described, through the injector 30 which includes a valve 32 biased by a spring 34 to a closed position which is sufficiently strong to maintain the delivery conduit 28 unless a positive pressure is developed in the reservoir 26. The injector valve 32 typically is closed when the engine is not operating to prevent leakage of coolant.

The reservoir 26 has a cover member 36 removably connected to the top of the container portion forming the reservoir 26. Cover member 36 is made up of an upper housing 38 and a lower housing 40 which act to house control means 41 including a diaphragm member 42 clamped therebetween. The lower housing 40 forms an axially extending passage 44 one end of which communicates with the reservoir 26 and the other end of which forms an annular valve seat 46 which in the illustrated position is closed by a portion of the diaphragm 42. In the closed position of the valve seat 46, it is isolated from an annular chamber 48 formed around the annular valve seat 46 and communicating by way of a passage 50 and tube 52 with the atmosphere. The diaphragm 42 is urged to its closed position on the annular valve seat 46 by means of a coil spring 54, one end of which is seated at one end of a cavity 56 in the upper housing 38, and the other end acts against the diaphragm 42. The cavity 56 communicates by way of a passage 58 with a port 60 and a conduit 61 to join with the intake manifold 20. The interior of the reservoir 26 communicates through a passage 62 and a cavity 64, with a branch passage 65 to a passage 58, formed in the housings 38 and 40. The cavity 64 contains a ball check valve 66 which is held in a seated position by a spring 68.

In operation, when the engine 12 is started the resultant exhaust gasses drive the turbine 22 and induction or intake air and fuel from the carburetor 18 passes through the compressor 16 to the intake manifold 20 so that the pressure in the intake manifold 20 varies between a vacuum, for example, to the order of 20 inches of mercury to a positive pressure of 6 or 7 PSI depending on the loading of the engine. When the manifold pressures are subatmospheric, the diaphragm 42 is acted on by the differential pressure of atmospheric pressure at its underside opposed by the vacuum or negative pressure at its upper side so that diaphragm 42 moves against the action of the coil spring 54 to open passage 44 to tube 52 and the atmosphere. At the same time the ball check valve 66 is maintained in closed position by the spring 68. As the pressure in the manifold 20 increases, for example, upon acceleration of the engine 12, and the pressure in manifold 20 becomes positive or higher than atmospheric pressure, the diaphragm 42 closes on the annular valve seat 46 and the ball check valve 66 becomes unseated to place the reservoir 26 in communication with the intake manifold 20. In this manner the reservoir 26 becomes pressurized. When the pressure in the reservoir 26 achieves some predetermined level, for example, 4 PSI, as determined by the strength of spring 54, the pressurized coolant in the reservoir 26, causes the injector valve 32 to become unseated against the biasing action of the spring 34 so that coolant is injected into the carburetor 18. Such injection continues so long as the manifold 20 is maintained at some pressure in excess of the predetermined pressure. If however, the engine 12 is allowed to decelerate to decrease the pressure in the manifold 20 below the predetermined level, the diaphragm 42 instantly moves to an open position to open the annular valve seat 46 and passage 44 to the chamber 48 continuously maintained at atmospheric pressure through the passage 50 and tube 52. This causes the reservoir 26 to have its internal pressure decreased to atmospheric pressure causing the injector valve 32 to move to its closed position. In this manner the injection apparatus 10 is instantly put in an inoperative condition so that additional coolant is not injected into the carburetor at a time when it is not needed with possible harm to the engine or to efficient operation.

During the operation of the engine 12, the reservoir 26 is pressurized to acuate the injector 30 when the output of the compressor 16 is a positive pressure above a predetermined value and deactuates the injector as the engine 12 is decelerated and pressure drops below the predetermined level. In this manner coolant is injected only when it is needed to cool the hot fuel and air mixture in the manifold 20 prior to delivery to the engine 12.

When the engine 12 is stopped the pressure in the intake manifold 20 becomes atmospheric pressure and check valve 66 and diaphragm 42 return to their seated position with the interior of the reservoir 26 at atmospheric pressure. This together with the closure of the injector valve 32 prevents escape of coolant from the reservoir 26.

With the injecting apparatus 10 as seen in FIG. 1 the reservoir 26 is relieved of pressure anytime that the positive pressure in the manifold 20 is below some predetermined pressure level thereby relieving the reservoir 26 and associated parts of pressure loads which increases the life of the parts and avoids the possibility of coolant leaking into the engine fuel system. The predetermined pressure level is established by the characteristics of the spring 54.

Referring now to FIG. 2, another embodiment of the invention is in the form of apparatus for cooling the combustion air of the internal combustion engine and is designated generally at 80. The injection apparatus 80 can be connected with an internal combustion engine 12 in the same manner as the prior embodiment of the invention. For this purpose the injecting apparatus 80 is provided with a port 82 which can be connected to the conduit 61 seen in FIG. 1 and an outlet port 84 which can be connected to the delivery conduit 28 also seen in FIG. 1.

The injection apparatus 80 includes a reservoir 86 which acts to hold the coolant to be injected at the carburetor 18 or inlet side of the compressor 16.

The control means by which injection of coolant is regulated is designated at 88 and is housed within the reservoir 86. The control means 88 includes a control port 90 which is connected to the intake manifold 20 seen in FIG. 1 so that pressure at the port 90 reflects the pressure conditions in the manifold 20. The control means 88 includes a spool 92 which is biased by means of a spring 94 toward the position illustrated in FIG. 2. The spool 92 is disposed in a cavity 96, one end of which communicates with port 90 and the other end opens to the atmosphere through opening 97. The spool 92 slides in cavity 96 and is sealed relative thereto by O-rings 98. In the full range of movement of the spool 92, the O-rings 98 are disposed to opposite sides of a passage 100 between cavity 96 and the interior of the reservoir 86. In the illustrated position, both the port 84 and the passage 100 are closed by a land 102 on spool 92. When the port 90 is subjected to a positive predetermined pressure in port 90 the spool 92 is moved upwardly against the force of atmospheric pressure at opening 97 and the resistance of spring 94 to move the land 102 out of alignment with the passage 100 and port 84 to place the interior of the reservoir 86 in communication with the port 84 through an annular groove 104.

The coolant in the reservoir 86 is pressurized through port 82 which communicates with a ball check valve 106 normally held in closed position by a spring 108. The check valve 106 moves to an open position in the presence of the predetermined positive pressure level in manifold 20 to also pressurize the interior of the reservoir 86.

The operation of the embodiment of the invention seen in FIG. 2 is similar to the embodiment in FIG. 1 in that coolant is injected into the air and fuel mixture at the carburetor 18 upstream of the compressor 16 when pressure in the manifold 20 reaches some predetermined positive pressure level, for example four psi. When pressure is below that level, the land 102 closes the aligned port 84 and passage 100 to prevent further escape of pressurized coolant. Such predetermined pressure level is determined by the force of spring 94.

In this embodiment of the invention the reservoir 86 remains pressurized even after the engine is stopped in readiness for injection of coolant when the engine is restarted if coolant should be needed.

The embodiment of the invention in which an exclusive property or privilege is claimed are defined as follows:

1. Apparatus for injecting coolant in the fuel-air mixture supplied to a compressor of a turbocharged engine comprising: a reservoir for storing liquid coolant, passage means connecting said reservoir to the outlet side of a turbocharger compressor, valve means in said passage means operable in response to a positive pressure at the outlet side of said compressor to pressurize said reservoir for propelling liquid coolant therefrom, a delivery passage between said reservoir and the outlet side of said compressor to deliver liquid coolant from said reservoir, and control means responsive to a predetermined level of pressure at said outlet side of said compressor to place said reservoir in liquid communication with said inlet side of said compressor and responsive to a pressure below said predetermined pressure to relieve pressure in said reservoir and interrupt delivery of coolant from said reservoir to said inlet side of said compressor.

2. The apparatus of claim 1 wherein said valve means is a one-way check valve opening communication between the outlet side of said compressor and said reservoir in response to said positive pressure.

3. The apparatus of claim 1 wherein said control means includes a moveable wall member responsive to differential pressure of atmospheric pressure at one side of said wall member and pressure at the outlet side of said compressor communicated to the other side of said wall member to move between positions isolating and communicating said reservoir with the atmosphere.

4. The apparatus of claim 3 wherein said wall member is a diaphragm having a portion engageable with a valve seat controlling communication between said reservoir and the atmosphere.

5. The apparatus of claim 1 wherein said control means is responsive to a pressure below said predetermined pressure at said outlet of said compressor to maintain said reservoir closed to atmospheric pressure when the pressure at the outlet side of said compressor is at said predetermined pressure and to open said reservoir to atmospheric pressure when the pressure at the outlet of said compressor is below said predetermined pressure.

6. The apparatus of claim 1 wherein said reservoir has a removable cover member permitting the addition of liquid collant to said reservoir.

7. The apparatus of claim 6 wherein said control means is disposed within said cover member.

8. The apparatus of claim 7 wherein said cover member is made up of a pair of housings and wherein said control means includes a flexible diaphragm member clamped between said housing members.

* * * * *

UNITED STATES PATENT AND TRADEMARK OFFICE
CERTIFICATE OF CORRECTION

PATENT NO. : 4,440,116

DATED : April 3, 1984

INVENTOR(S) : David L. Stevenson; Corunna; and Seleno, Frank M.

It is certified that error appears in the above-identified patent and that said Letters Patent is hereby corrected as shown below:

Column 3, line 39, delete "acuate" and insert — actuate —

Column 4, line 65, delete "outlet" and insert — inlet —

Column 6, line 14, delete "collant" and insert — coolant —

Signed and Sealed this

Twenty-sixth Day of March 1985

[SEAL]

Attest:

DONALD J. QUIGG

Attesting Officer   Acting Commissioner of Patents and Trademarks